(12) United States Patent
Shirokoshi

(10) Patent No.: US 12,442,445 B2
(45) Date of Patent: Oct. 14, 2025

(54) LUBRICATING STRUCTURE FOR GEAR TOOTH SURFACE

(71) Applicant: HARMONIC DRIVE SYSTEMS INC., Tokyo (JP)

(72) Inventor: Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/717,418

(22) PCT Filed: Jan. 18, 2022

(86) PCT No.: PCT/JP2022/001567
§ 371 (c)(1),
(2) Date: Jun. 6, 2024

(87) PCT Pub. No.: WO2023/139636
PCT Pub. Date: Jul. 27, 2023

(65) Prior Publication Data
US 2025/0043861 A1    Feb. 6, 2025

(51) Int. Cl.
*F16H 57/04* (2010.01)
(52) U.S. Cl.
CPC ................ *F16H 57/0431* (2013.01)
(58) Field of Classification Search
CPC .................. F16H 57/0431; F16H 57/04
See application file for complete search history.

(56) References Cited

U.S. PATENT DOCUMENTS

| | | | |
|---|---|---|---|
| 5,556,351 A | 9/1996 | Hiraishi et al. | |
| 11,885,403 B2 * | 1/2024 | Orii | F16J 15/3244 |
| 12,092,221 B2 * | 9/2024 | Orii | F16H 49/001 |
| 2021/0316445 A1 | 10/2021 | Masai et al. | |

FOREIGN PATENT DOCUMENTS

| | | | |
|---|---|---|---|
| JP | H3-94455 U | 9/1991 | |
| JP | H7-98051 A | 4/1995 | |
| JP | H8-178017 A | 7/1996 | |
| JP | 2005-188740 A | 7/2005 | |
| JP | 2017-72234 A | 4/2017 | |
| JP | 2021-167650 A | 10/2021 | |
| WO | WO2020105186 A1 * | 5/2020 | F16H 1/32 |

OTHER PUBLICATIONS

PCT/ISA/210, "International Search Report for PCT International Application No. PCT/JP2022/001567," Mar. 22, 2022.

* cited by examiner

*Primary Examiner* — Bobby Rushing, Jr.
(74) *Attorney, Agent, or Firm* — Kreative IP Management LLC; Fuiyeong Kim

(57) ABSTRACT

In each of tooth tip surfaces of internal teeth of an internally toothed gear and external teeth of an externally toothed gear of a strain wave gearing, lubricant passage grooves are formed at fixed intervals along the tooth trace direction. Each of the lubricant passage grooves is an inclined groove that extends in a direction inclined to one side in the tooth trace direction. The inclined grooves facilitate the flow of the lubricant such as grease confined in gaps between the internal teeth and the external teeth and thus the lubricant is efficiently supplied to the tooth surfaces of both teeth.

3 Claims, 2 Drawing Sheets

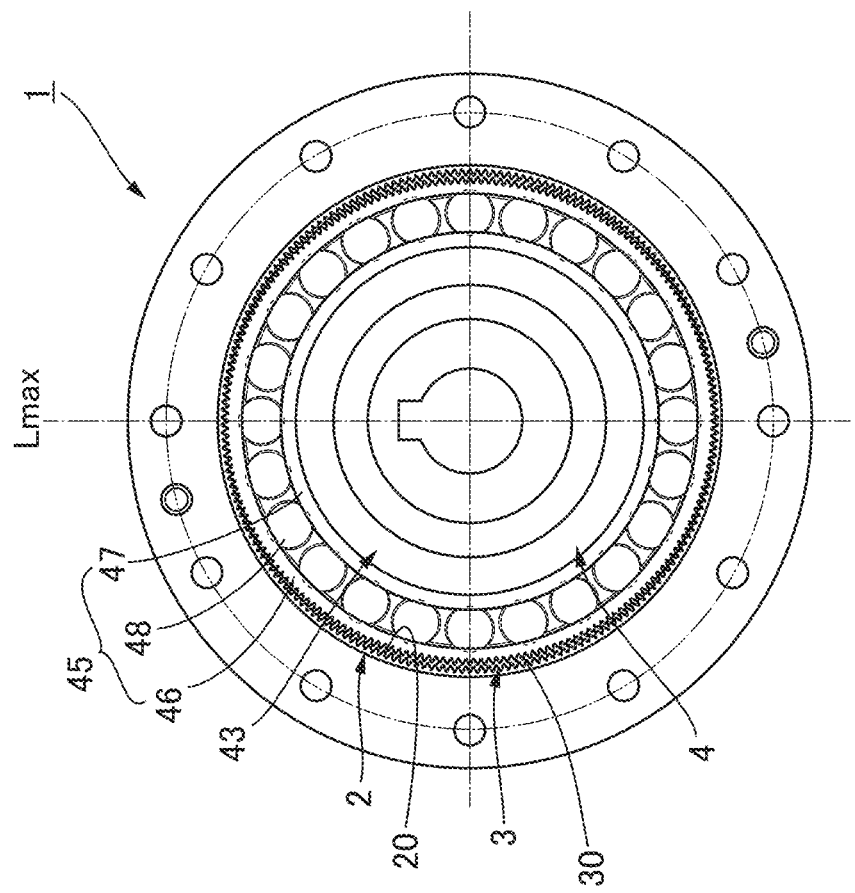
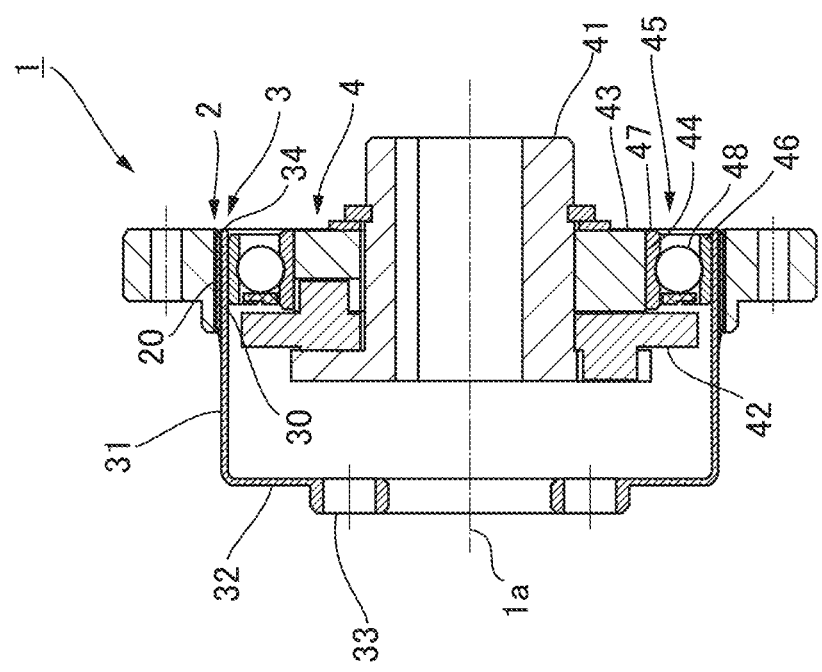

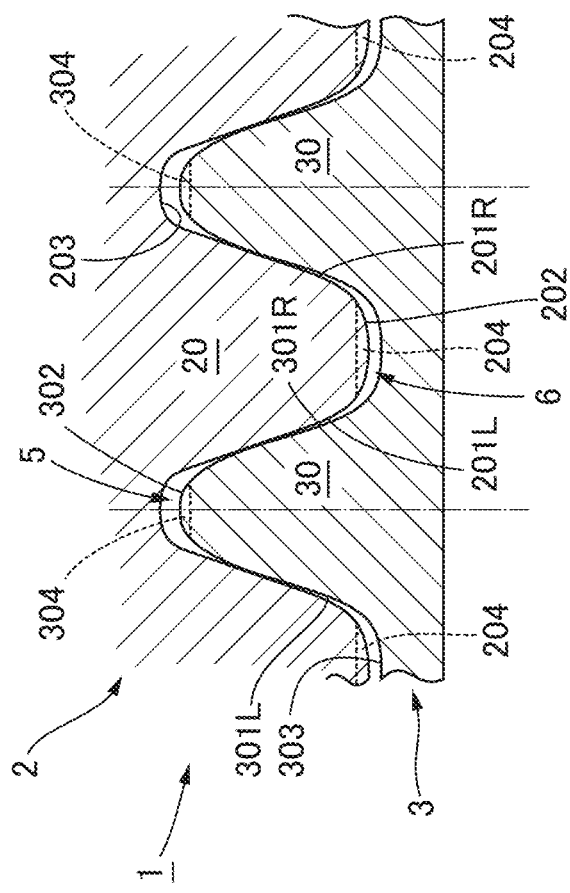
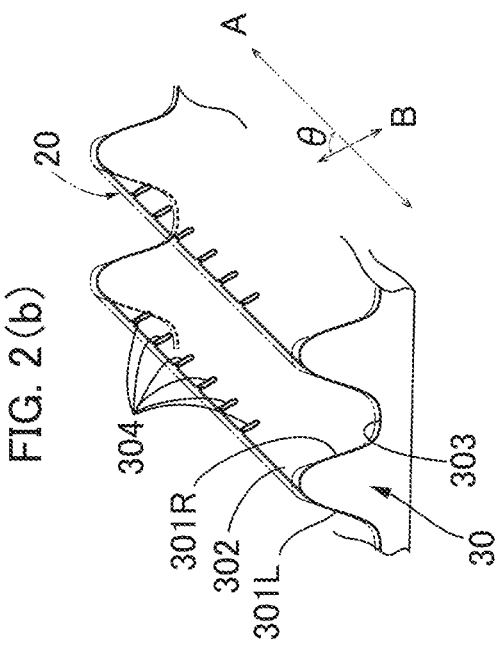
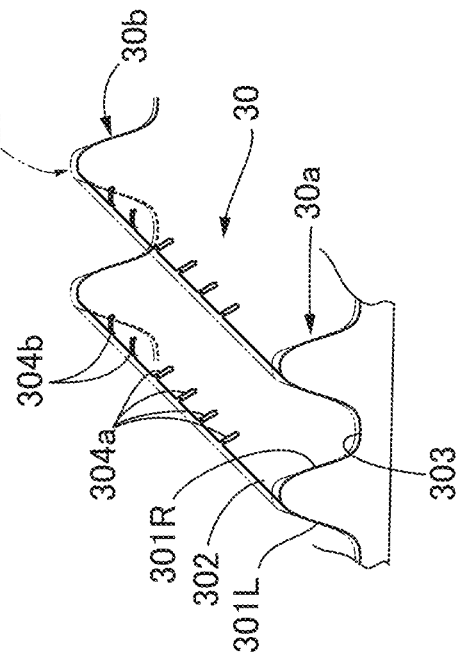
FIG. 2(a)
FIG. 2(b)
FIG. 2(c)

LUBRICATING STRUCTURE FOR GEAR TOOTH SURFACE

CROSS-REFERENCE TO RELATED APPLICATIONS

This application is a national stage entry of International Application No. PCT/JP2022/001567, filed on Jan. 18, 2022, the entire disclosures of which are hereby incorporated by reference herein.

TECHNICAL FIELD

The present invention relates to a lubricating structure for tooth surfaces in which a lubricant is supplied to gear tooth surfaces.

BACKGROUND ART

In certain circumstances, lubricant is pushed out from gear meshing portions and cannot be efficiently supplied to tooth surfaces. For example, when meshing of gears advances obliquely relative to a direction perpendicular to a shaft, as is the case with strain wave gearings, helical gears, spiral bevel gears, and the like, lubricant present between teeth that mesh with one another is pushed out to tooth-trace-direction end sections and tends not to remain on the tooth surfaces. In the case of lubrication with grease in particular, the grease tends not to remain on the tooth surfaces.

However, from the standpoint of excellence of maintenance properties and reliability of oil leakage prevention, there is a demand for lubrication with grease, especially grease having a high consistency. This gives rise to the issue of ensuring reliability of lubrication on the tooth surfaces in the case of lubrication with grease.

Patent Document 1 proposes forming, as a lubricating structure in a strain wave gearing, fine protrusions at fixed intervals over the entirety of tooth surfaces of an internally toothed gear and an externally toothed gear of the strain wave gearing in order to retain lubricant on the tooth surfaces. Patent Document 2 proposes cutting grooves for promoting the flow of lubricant into teeth of an internally toothed gear and an externally toothed gear.

PRIOR-ART DOCUMENTS

Patent Documents

Patent Document 1: JP-A 2021-167650
Patent Document 2: JP-A 2017-72234

DISCLOSURE OF THE INVENTION

Problems to be Solved by the Invention

It is an object of the present invention to provide a lubricating structure for gear tooth surfaces in which a lubricant is efficiently supplied to tooth surfaces of a pair of gears that mesh with one another.

Means of Solving the Problems

In the present invention:
a plurality of lubricant passage grooves are formed, in tooth tips of teeth of at least one gear from among a pair of gears that mesh with one another, at prescribed intervals along a tooth trace direction; and
each of the lubricant passage grooves is an inclined groove that extends from one tooth surface to another tooth surface of each tooth in a direction that is inclined toward one side relative to the tooth trace direction.

In certain circumstances, one of the lubricant passage grooves that is formed at the position nearest to one tooth trace end of each tooth, or a plurality of the lubricant passage grooves counting from the tooth-trace-end side, are reversely inclined grooves that are inclined relative to the tooth trace direction in a direction opposite that of the inclined grooves.

Effect of the Invention

The inclined grooves cut into the tooth tips of the teeth that mesh with one another promote the flow of grease or another lubricant that is sealed within clearances between the teeth, therefore making it possible to efficiently supply the lubricant to the tooth surfaces.

Additionally, in cases where a reversely inclined groove is provided to a tooth-trace-direction end, the lubricant flowing toward the tooth-trace-direction end can be pushed back toward the tooth-trace-direction center by the reversely inclined groove, therefore making it possible to cause the lubricant to remain on the tooth surfaces for a longer period of time.

BRIEF DESCRIPTION OF THE DRAWINGS

FIG. 1(a) is a schematic longitudinal cross-sectional view showing the overall configuration of a cup-type strain wave gearing to which the present invention is applied, and FIG. 1(b) is a schematic end-surface view of the same; and FIG. 2(a) is an explanatory diagram showing pairs of internal teeth and external teeth in a meshed state, FIG. 2(b) is an explanatory diagram showing lubricant passage grooves that are formed in the tooth tips of the external teeth, and FIG. 2(c) is an explanatory diagram showing an example of a case where inclined grooves and reversely inclined grooves are formed as the lubricant passage grooves.

MODE FOR CARRYING OUT THE INVENTION

A strain wave gearing according to an embodiment to which the present invention is applied is described below with reference to the accompanying drawings. With reference to FIG. 1, the strain wave gearing 1 is configured from an annular rigid internally toothed gear 2, a cup-shaped flexible externally toothed gear 3 that is coaxially disposed on the inner side of the internally toothed gear 2, and an ellipsoidally contoured wave generator 4 that is fitted into the inner side of the externally toothed gear 3.

The externally toothed gear 3 is provided with a barrel part 31, a diaphragm 32, and a boss 33, and is formed in the shape of cup overall. The barrel part 31 is formed in a cylindrical shape and is capable of flexing radially. One end of the barrel part 31 is configured as an open end 34, and external teeth 30 are formed on a barrel-part outer peripheral surface portion on the open-end 34 side. The diaphragm 32 extends radially inward continuously with the other end of the barrel part 31. The annular boss 33 is formed continuously with the inner peripheral edge of the diaphragm 32. The boss 33 is a rigid portion for attaching the externally toothed gear 3 to another member (not shown). The internally toothed gear 2 is disposed in a state surrounding the external teeth 30 of the externally toothed gear 3. The external teeth 30 are capable of meshing with internal teeth 20 that are formed on the inner peripheral surface of the internally toothed gear 2.

The wave generator 4 is configured from a hollow hub 41, a rigid wave generator plug 43 that is mounted on the outer periphery of the hollow hub 41 with an Oldham coupling 42 interposed therebetween, and a wave generator bearing 45 that is fitted to an ellipsoidal plug outer peripheral surface 44 of the wave generator plug 43. The portion of the barrel part 31 of the externally toothed gear 3 where the external teeth 30 are formed is caused by the wave generator 4 to flex from a true circle, which is the initial state, into an ellipsoidal shape. The external teeth 30 mesh with the internal teeth 20 of the internally toothed gear 2 at positions at both ends of a long axis Lmax of the ellipsoidal shape.

The wave generator bearing 45 is provided with circular outer and inner races 46, 47 that are capable of flexing in the radial direction, and a plurality of balls 48 that are mounted between the outer race 46 and the inner race 47 so as to be capable of rolling. The wave generator bearing 45 is fitted into the inner side of the externally toothed gear 3 in a state of being flexed into an ellipsoidal shape by the wave generator plug 43, and the externally toothed gear 3 and the wave generator plug 43 are retained in a state that allows relative rotation. The wave generator plug 43 is linked to a high-speed-rotation input shaft (not shown).

When the wave generator 4 rotates about a center axis 1a, the meshing positions of the gears 2, 3 rotate in a circumferential direction. Due to this rotation, the externally toothed gear 3 and the internally toothed gear 2 rotate relative to one another in accordance with a difference in the number of teeth between the external teeth 30 and the internal teeth 20. For example, if the internally toothed gear 2 is fixed and the wave generator 4 is a high-speed-rotation input element, then the externally toothed gear 3 is a reduced-rotation output element from which rotation output, reduced in accordance with the difference in the number of teeth between the gears 2, 3, is taken.

FIG. 2(a) is an explanatory diagram showing pairs of internal teeth 20 and external teeth 30 in a meshed state, and FIG. 2(b) is an explanatory diagram showing lubricant passage grooves that are formed in the tooth tips of the external teeth 30. The tooth profile of the internal teeth 20 is defined by left and right meshing tooth surfaces 201L, 201R that participate in meshing with the external teeth 30, arcuate convex tooth tip surfaces 202 that connect the addendum-side ends of the meshing tooth surfaces 201L, 201R and do not participate in meshing, and arcuate concave tooth root surfaces 203 that connect the dedendum-side ends of the meshing tooth surfaces 201L, 201R and do not participate in meshing. Similarly, the tooth profile of the external teeth 30 is defined by left and right meshing tooth surfaces 301L, 301R that participate in meshing with the internal teeth 20, arcuate convex tooth tip surfaces 302 that connect the addendum-side ends of the meshing tooth surfaces 301L, 301R and do not participate in meshing, and arcuate concave tooth root surfaces 303 that connect the dedendum-side ends of the meshing tooth surfaces 301L, 301R and do not participate in meshing.

A plurality of fine lubricant passage grooves 204 are formed in the tooth tip surfaces 202 of the internal teeth 20. Additionally, lubricant passage grooves 304 are formed in the tooth tip surfaces 302 of the external teeth 30 at fixed intervals along the tooth trace direction.

As shown in FIG. 2(b), the lubricant passage grooves 304 formed in the external teeth 30 extend on the tooth tip surfaces 302 from one meshing tooth surface 301L to the other meshing tooth surface 301R. The lubricant passage grooves 304 in the present example are formed at fixed intervals along the tooth trace direction and are all identical grooves (have the same width, the same depth, and the same cross-sectional shape), the angles of inclination of the lubricant passage grooves 304 relative to the tooth trace direction are the same, and the lubricant passage grooves 304 extend in a direction parallel to a tangent line that passes through the apex of the tooth tip surfaces 302. For example, the lubricant passage grooves 304 extend in a direction that is inclined by 45° in the same direction relative to the tooth trace direction.

In the present example, the lubricant passage grooves 204 in the internal teeth 20 are also formed in the same manner. Specifically, the lubricant passage grooves 204 extend on the tooth tip surfaces 202 from one meshing tooth surface 201L to the other meshing tooth surface 201R. The lubricant passage grooves 204 are formed at fixed intervals along the tooth trace direction. The lubricant passage grooves 204 are all identical grooves (have the same width, the same depth, and the same cross-sectional shape), the angles of inclination of the lubricant passage grooves 204 relative to the tooth trace direction are the same, and the lubricant passage grooves 204 extend in a direction parallel to a tangent line that passes through the apex of the tooth tip surfaces 202. For example, the lubricant passage grooves 204 extend in a direction that is inclined by 45° in the same direction relative to the tooth trace direction.

The lubricant passage grooves 204, 304 facilitate movement of lubricant that is sealed within clearances 5, 6 between the internal teeth 20 and the external teeth 30 and make it possible to efficiently supply the lubricant to the meshing tooth surfaces 201L, 201R, 301L, 301R. Such inclined grooves can be formed in, e.g., a lathing step that precedes cutting of gear elements.

In cases where inclined grooves extending in a direction B that is inclined by an angle θ in the same direction relative to the tooth trace direction A are formed as lubricant passage grooves 204, 304, a flow toward one side in the tooth trace direction is produced in grease or another lubricant at meshing portions of the internal teeth 20 and the external teeth 30. Reversely inclined grooves that are inclined in the opposite direction can also be formed as the inclined grooves at portions on the tooth-trace-direction ends of the internal teeth 20 and the external teeth 30.

For example, as shown in FIG. 2(c), inclined grooves 304a that are inclined in the same direction at fixed intervals are formed from one tooth-trace-direction end 30a toward the other tooth-trace-direction end 30b, and a plurality of reversely inclined grooves 304b at fixed intervals are formed on the end 30b side, as the lubricant passage grooves 304 in the external teeth 30. The lubricant passage grooves 204 can be formed in the same manner in the internal teeth 20 as well.

Such a configuration allows the flow of lubricant toward the tooth-trace-direction ends is pushed back toward the opposite direction by the reversely inclined grooves, and makes it possible to cause the lubricant to remain on the tooth surfaces of the internal teeth 20 and the external teeth 30 for a longer period of time. This makes it possible to improve the effect for lubricating the tooth surfaces.

OTHER EMBODIMENTS

The present invention is not limited to strain wave gearings and can be applied to other gearing devices as well.

Particularly in gearing devices, including strain wave gearings, that are provided with gears such as helical gears, spiral bevel gears, and the like in which meshing advances obliquely relative to a direction perpendicular to a shaft, lubricant is pushed out toward tooth-trace-direction ends of gear meshing portions and tends not to remain on tooth surfaces. The lubricating structure for tooth surfaces according to the present invention is effective for such gearing devices.

The invention claimed is:

1. A lubricating structure for gear tooth surfaces, comprising:
    a pair of gears that meshes with one another, at least one of the pair of gears including
        teeth that respectively have tooth tips, and
        a plurality of lubricant passage grooves that is formed, at each of the tooth tips, at predetermined intervals along a tooth trace direction, each of the plurality of lubricant passage grooves extending from one tooth surface of each of the teeth to another tooth surface thereof, and that includes
            a plurality of inclined grooves, each of the plurality inclined grooves being inclined toward one end of the at least one of the pair of gears relative to the tooth trace direction, and
            at least one reversely inclined groove that is inclined toward an opposite end of the at least one of the pair of gears relative to the tooth trace direction in a direction opposite to each of the plurality of inclined grooves,
    wherein the plurality of inclined grooves is formed at predetermined intervals from one tooth trace end of each of the tooth tips toward another tooth trace end thereof in the tooth trace direction, and
    the at least one reversely inclined groove is formed at the another tooth trace end where the plurality of inclined grooves is not formed in the tooth trace direction, and at a position nearest to the another tooth trace end of each of the tooth tips or at each of a plurality of positions from the another tooth trace end of each of the tooth tips.

2. The lubricating structure for gear tooth surfaces according to claim 1, wherein the pair of gears includes a rigid internally toothed gear and a flexible externally toothed gear of a strain wave gearing, the externally toothed gear being capable of flexing radially.

3. The lubricating structure for gear tooth surfaces according to claim 2, wherein the externally toothed gear is provided with a cup-shaped or top-hat-shaped cylindrical barrel part that is capable of flexing in a radial direction, a diaphragm that extends radially from one end of the cylindrical barrel part, a rigid annular boss that is formed on an inner peripheral edge or an outer peripheral edge of the diaphragm, and external teeth that are formed on an other-end side of the cylindrical barrel part.

* * * * *